United States Patent [19]
Furukawa

[11] Patent Number: 5,019,982
[45] Date of Patent: May 28, 1991

[54] METHOD OF CONTROLLING REAR WHEELS OF A FOUR-WHEEL STEERING MOTOR VEHICLES

[75] Inventor: Yoshimi Furukawa, Tokyo, Japan

[73] Assignee: Honda Giken Kogyo Kabushiki Kaisha, Tokyo, Japan

[21] Appl. No.: 410,281

[22] Filed: Sep. 21, 1989

Related U.S. Application Data

[63] Continuation-in-part of Ser. No. 118,398, Nov. 5, 1987, which is a continuation-in-part of Ser. No. 690,167, Jan. 16, 1985, Pat. No. 4,964,481.

[30] Foreign Application Priority Data

Sep. 22, 1988 [JP] Japan ................... 63-237794

[51] Int. Cl.$^5$ ............................................. B62D 6/04
[52] U.S. Cl. ............................ 364/424.05; 180/140; 280/91
[58] Field of Search .............. 364/424.05; 180/79.1, 180/140–142; 280/91

[56] References Cited

U.S. PATENT DOCUMENTS

| 3,903,983 | 9/1975 | Yeske | 280/91 X |
|---|---|---|---|
| 3,933,215 | 1/1976 | Scheuerle | 180/23 |
| 4,175,638 | 11/1979 | Christensen | 180/140 |
| 4,315,555 | 2/1982 | Schritt | 180/140 |
| 4,412,594 | 11/1983 | Furukawa et al. | 180/140 |
| 4,418,780 | 12/1983 | Ito et al. | 180/142 |
| 4,473,128 | 9/1984 | Nakayama et al. | 180/142 |
| 4,527,654 | 7/1985 | Shibahata et al. | 180/140 |
| 4,566,710 | 1/1986 | Koizumi et al. | 280/91 |
| 4,566,711 | 1/1986 | Koizumi et al. | 280/91 |
| 4,598,788 | 7/1986 | Serizawa et al. | 180/140 |
| 4,621,823 | 11/1986 | Sano | 280/91 |
| 4,828,064 | 5/1989 | Furutani et al. | 180/140 |
| 4,872,116 | 10/1989 | Ito et al. | 364/424.05 |
| 4,878,557 | 11/1989 | Shibahata et al. | 364/424.05 X |
| 4,941,095 | 7/1990 | Imaseki et al. | 364/424.05 |
| 4,942,532 | 7/1990 | Mori | 304/424.05 |

FOREIGN PATENT DOCUMENTS

| 198450 | 6/1990 | European Pat. Off. . |
|---|---|---|
| 53-40930 | 4/1978 | Japan . |
| 59-26363 | 2/1984 | Japan . |
| 60-166561 | 8/1985 | Japan . |
| 2153311 | 8/1985 | United Kingdom . |

Primary Examiner—Thomas G. Black
Attorney, Agent, or Firm—Irving M. Weiner; Joseph P. Carrier; Pamela S. Burt

[57] ABSTRACT

The rear road wheels of a four-wheel steering motor vehicle are controlled so that a steer angle ratio of a rear wheel steer angle to a front wheel steer angle is variably controlled depending on the lateral acceleration. The steer angle ratio is selected so as to be in a range defined by:

$$f1(yo) - g(yo) \cdot f2(yo) \geq 0$$

where
$f1(yo) = Cfo/mf$;
$f2(yo) = Cro/mr$;
Cfo, Cro are equivalent cornering powers of the tires of the front and rear road wheels while the motor vehicle is making a steady-state turn; and
mf, mr are equivalent masses at the front and rear axles of the motor vehicle.

6 Claims, 6 Drawing Sheets

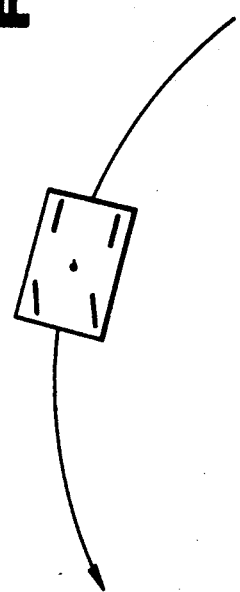
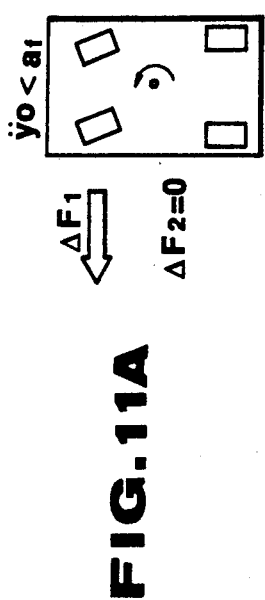
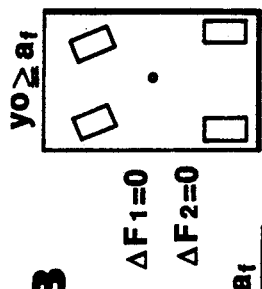
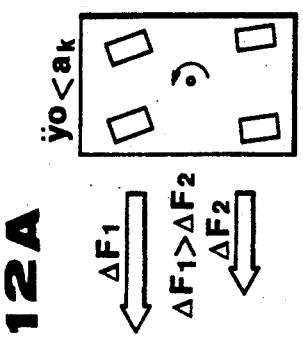
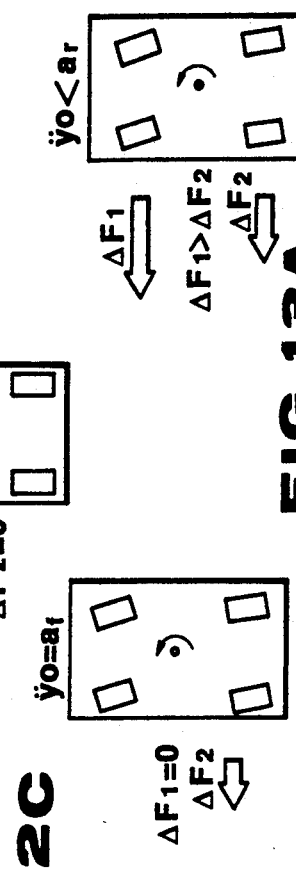
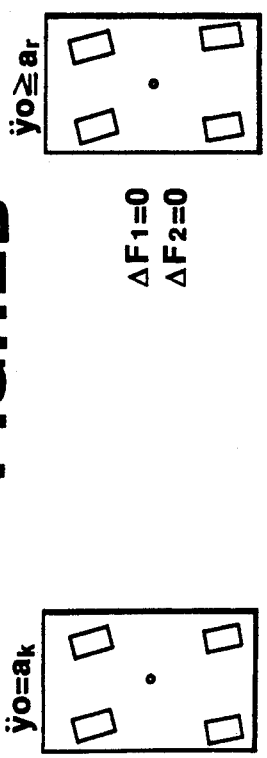
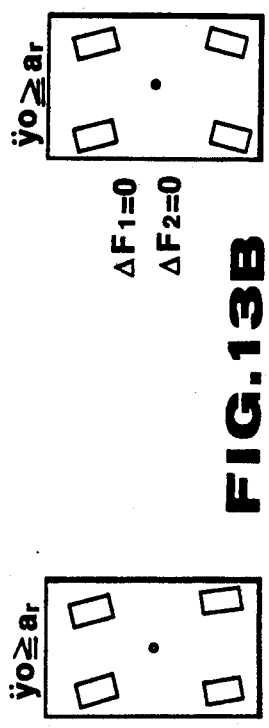
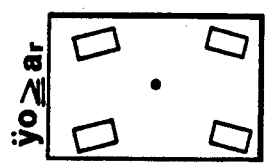

METHOD OF CONTROLLING REAR WHEELS OF A FOUR-WHEEL STEERING MOTOR VEHICLES

This application is a continuation-in-part of each of prior applications Ser. No. 690,167, filed Jan. 10, 1985 now U.S. Pat. No. 4,964,481 and Ser. No. 118,398 filed Nov. 5, 1987.

BACKGROUND OF THE INVENTION

1. Field of the Invention

The present invention relates to a method of controlling the steer angle of a road wheel of a motor vehicle, and more particularly to a method of controlling the steer angle of rear road wheels of a four-wheel steering motor vehicle.

2. Description of the Relevant Art

Steer response characteristics of a motor vehicle having only two front road wheels which are steerable (hereinafter referred to as a "2WS motor vehicle") will be described below.

A 2WS motor vehicle has a different yaw response to movement of the steering wheel while the motor vehicle is running straight ahead from a yaw response during turns. More specifically, the yaw rate gain of a 2WS motor vehicle tends to be nonlinear so that it is lower as the lateral acceleration ÿo of the motor vehicle is higher when the motor vehicle is making a turn. As is generally known, the reason for this is that the cornering power Cf of front road tires is lowered as the lateral slip angle cf of the front road wheels is increased. As described above, the yaw response of a 2WS motor vehicle during a turn is governed by the characteristics with which the lateral force F1 of the front road tires is generated with respect to the lateral slip angle αf.

In order to change the yaw response during turns without varying various parameters such as the weight m of the motor vehicle, the yawing moment Iz of inertia, the wheelbase l, the tread T, and the aspect ratio and material of the tires, it is general practice to adjust the roll stiffness and changes in alignment of the front and rear suspensions of the motor vehicle. However, such an adjusting process is based on the principle that the characteristics with which the lateral forces F1, F2 of the front and rear wheel tires are varied depend on the turning condition of the motor vehicle while passively utilizing the response of the motor vehicle body during the turn. Therefore, it is difficult to largely vary the yaw response of the motor vehicle. It is still more difficult to finely vary the yaw response depending on various values of motion of the motor vehicle such as the vehicle speed V and the lateral acceleration ÿo.

In the 2WS motor vehicle, during a turn in which the lateral acceleration ÿo applied to the motor vehicle is large, the cornering power Cf of the front wheel tires is almost zero, i.e., the lateral force F1 generated by the front wheel tires to turn the vehicle body in a yawing direction is saturated. Accordingly, even if the suspensions are finely adjusted to vary the yaw responsiveness, the yaw rate gain is approximately zero and any suspension adjustment is ineffective during turns in which the motor vehicle is subjected to large lateral accelerations ÿo.

Japanese Laid-Open Patent Publication No. 60(1985)-166561 published Aug. 29, 1985, for example, discloses a steering control process for a motor vehicle in which two front road wheels and two rear road wheels are steerable (hereinafter referred to as a "4WS motor vehicle"). According to the disclosed steering control process, the steer angle ratio k of the rear wheel steer angle δr to the front wheel steer angle δf is varied depending on the lateral acceleration ÿo on the motor vehicle. More specifically, during a turn in which the front and and rear road wheels are turned in the same direction, when the lateral acceleration ÿo exceeds a certain level, the steer angle ratio k is switched to a small value. With this steering control process, however, it is impossible to obtain smooth yaw responsiveness in a wide lateral acceleration from a small lateral acceleration ÿo to a large lateral acceleration ÿo.

The present invention has been made in an effort to eliminate the aforesaid drawbacks of the conventional methods of controlling the road wheel steer angle of a motor vehicle.

SUMMARY OF THE INVENTION

It is an object of the present invention to provide a method of controlling the steer angle of rear road wheels of a 4WS motor vehicle to obtain smooth yaw responsiveness in a wide lateral acceleration range from a small lateral acceleration to a large lateral acceleration.

According to the present invention, there is provided a method of controlling rear road wheels of a four-wheel steering motor vehicle having front road wheels which can be turned by steering action, rear road wheels which can be turned in response to the turning of the front road wheels, and means for detecting a lateral acceleration applied to the motor vehicle, the arrangement being such that a steer angle ratio of a rear wheel steer angle to a front wheel steer angle is variably controlled depending on the lateral acceleration, said method comprising the step of:

selecting the steer angle ratio so as to be in a range defined by:

$$f1(\ddot{y}o) - g(\ddot{y}o) \cdot f2(\ddot{y}o) \geq 0$$

where $f1(\ddot{y}o) = Cfo/mf$;
$f2(\ddot{y}o) = Cro/mr$;

Cfo, Cro are equivalent cornering powers of the tires of the front and rear road wheels while the motor vehicle is making a steady-state turn; and mf, mr are equivalent masses at the front and rear axles of the motor vehicle.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 10 is a schematic plan view of a four-wheel motor vehicle which is making a steady-state turn;

FIGS. 11A and 11B are schematic plan views of a 2WS motor vehicle in a turn, specifically illustrating the change in the yaw response shown in FIG. 4;

FIGS. 12A through 12D are schematic plan views of a 4WS motor vehicle with a constant steer angle ratio, specifically illustrating the change in the yaw response shown in FIG. 6;

FIGS. 13A and 13B are schematic plan views of a 4WS motor vehicle to which the control method of the invention is applied, specifically illustrating the change in the yaw response shown in FIG. 8;

DETAILED DESCRIPTION OF THE PREFERRED EMBODIMENTS

Figure 1:
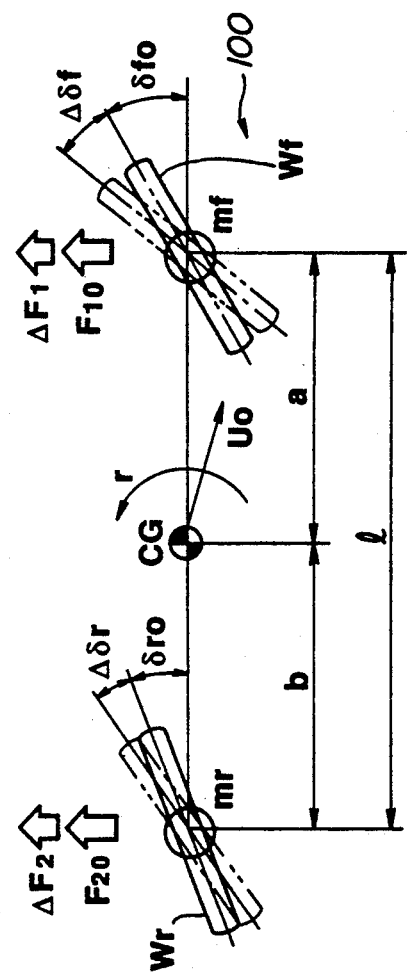
FIG. 1 is a schematic view of a two-wheel motor vehicle having a front road wheel and a rear road wheel, the view being used to analyze the steer response characteristics of a four-wheel motor vehicle, with the single front road wheel being representative of two front road wheels and the single rear road wheel of two rear road wheels.

FIGS. 1 through 13 show the principles of a method of controlling the steer angle of rear road wheels of a 4WS motor vehicle according to the present invention.

The principles of the present invention will be described as being applied to a four-wheel motor vehicle 100 having two front road wheels and two rear road wheels. More specifically, the dynamics of a yaw response of the motor vehicle 100 when it is slightly steered while the motor vehicle is making a steady-state turn will be analyzed. Such an analysis will be based on a two-wheel motor vehicle model 100 shown in FIG. 1 in which a single front road wheel represents the two front road wheels and a single rear road wheel represents the two rear road wheels.

The various reference characters are defined as follows:

m: vehicle mass;
a: distance from the center of gravity to the front axle;
b: distance from the center of gravity to the rear axle;
l: wheelbase ($=a+b$);
mf: equivalent vehicle mass at the front axle;
mr: equivalent vehicle mass at the rear axle;
Cf: equivalent cornering power of the front tires;
Cr: equivalent cornering power of the rear tires;
$\theta$sw: steering wheel steer angle;
$\delta$f: front wheel steer angle;
$\delta$r: rear wheel steer angle;
$\alpha$f: lateral slip angle of the front tires;
$\alpha$r: lateral slip angle of the rear tires;
F1: lateral force (cornering force) generated by the front tires during a turn;
F2: lateral force (cornering force) generated by the rear tires during a turn;
Iz: yawing moment of inertia of the motor vehicle;
t: time;
$\gamma$: yaw rate; and
$\ddot{y}$: lateral acceleration.

While the motor vehicle 100 is making a steadystate turn (indicated by the solid lines), the above reference characters are followed by a suffix "o". Denoted at Uo in FIG. 1 is a slip angle of the motor vehicle body itself.

Generally, a yaw response (=yawing moment) is indicated by:

$$Iz \frac{d\gamma}{dt} = F1 \cdot a - F2 \cdot b \qquad (1)$$

and is governed by a yawing moment Iz of inertia of the motor vehicle.

It is now assumed that the motor vehicle 100 shown in FIG. 1 is in a steady-state turn and various parameters are given as follows:

The steering wheel steer angle: $\theta$swo;
The front road wheel steer angle: $\delta$fo;
The rear road wheel steer angle: $\delta$ro;
The lateral force generated by the front wheels: F10; and
The lateral force generated by the rear wheels: F20.

A transient turning behavior of the motor vehicle 100 at the time the steering wheel steer angle $\theta$swo is instantaneously increased by a small angle $\Delta\theta$sw will be analyzed.

First, the above parameters F1, F2, $\delta$f, $\delta$r are increased by $\Delta$F1, $\Delta$F2, $\Delta\delta$f, $\Delta\delta$r, respectively, in response to the increase $\Delta\theta$sw in the steering wheel steer angle, and the front and rear road wheels Wf, Wr are turned to the respective positions which are indicated by the broken lines.

The yawing moment under such a transient condition is given as follows:

$$Iz \frac{d\gamma}{dt} = (F1 + \Delta F1) \cdot a - (F2 + \Delta F2) \cdot b$$

During the steady-state turn or cornering, the yawing moment is zero because it is in equilibrium. Therefore, $$Iz0 \frac{d\gamma}{dt} = F10 \cdot a - F20 \cdot b = 0$$

Consequently, the yaw response in the transient condition is defined as follows:

$$Iz \frac{d\gamma}{dt} = \Delta F1 \cdot a - \Delta F2 \cdot b \quad (2)$$

During the steady-state turn, the following relationship is effective:

$$F10/mf = F20/mr = \ddot{y}0 \quad (3)$$

Now, it is assumed that the motor vehicle 100 has an understeer response. In this case, values produced by dividing the lateral forces F1, F2 of the front and rear tires by the equivalent masses mf, mr, respectively, are plotted against the lateral slip angles $\alpha f$, $\alpha r$ of the front and rear road wheels as shown in FIG. 2.

Figure 2:
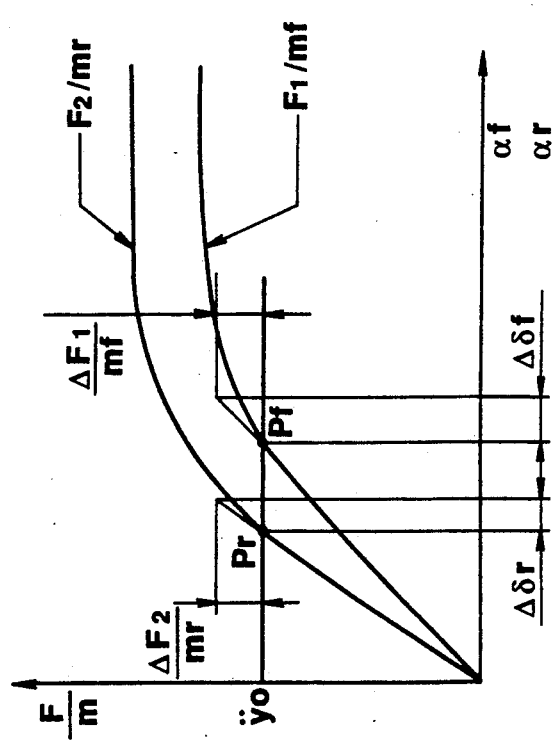
FIG. 2 is a diagram showing the manner in which cornering forces per unit weight of the front and rear road wheels vary while the motor vehicle shown in FIG. 1 is making a steady-state turn.

The lateral slip angles $\alpha f$, or $\alpha f$ of the front and rear road wheels in the steady-state turn condition expressed by the equation (3) above are represented by the coordinates on the horizontal axis of points Pr, Pf in FIG. 2, and the equivalent mass mf at the front axle and the equivalent mass mr at the rear axle are indicated by mf=m·b/l, mr=m·a/l, respectively. By multiplying these equations by a/mf and b/mr, respectively, we get a=m·a·b/(mf·l) and b=m·a·b/(mr·l), respectively. Putting these equations into the righthand side of the equation (2), the following equation is given:

$$Iz \frac{d\gamma}{dt} = \left( \frac{\Delta F1}{mf} - \frac{\Delta F2}{mr} \right) \cdot \frac{m \cdot a \cdot b}{l} \quad (2')$$

Lateral slip angles $\Delta \alpha f$, $\Delta \alpha r$ of the front and rear tires increased by the small steering wheel steer angle increase $\Delta \delta sw$ are equal to the increases $\Delta \delta f$, $\Delta \delta r$ in the front and rear wheel steer angles immediately after the motor vehicle is steered. The equivalent cornering powers Cfo, Cro (Cfo=$\partial F1/\partial \alpha f$), Cro=$\partial F2/\partial \alpha r$)) during the steady-state turn are regarded as being transiently constant. Therefore, increases $\Delta F1$, $\Delta F2$ in the lateral forces F1, F2 on the front and rear wheels are expressed by:

$$\Delta F1 = Cfo \cdot \Delta \alpha f \approx Cfp \cdot \Delta \delta f,$$

$$\Delta F2 = Cro \cdot \Delta \alpha r \approx Cro \cdot \Delta \delta r \quad (4)$$

Since the steer angle ratio k of the rear to front wheels is k=$\partial \delta r/\partial \delta f$, an increase $\Delta \delta r$ in the rear wheel angle when the rear wheel is slightly turned is given by:

$$\Delta \delta r = \frac{\partial \delta r}{\partial \delta f} \cdot \Delta \delta f \quad (5)$$

By putting the equations (4) and 5) into the equation (2), we get:

$$Iz \frac{d\gamma}{dt} = \left( Cfo \cdot a - Cro \cdot b \cdot \frac{\partial \delta r}{\partial \delta f} \right) \cdot \Delta \delta f \quad (6)$$

In the same manner as described above to obtain the equation (2'), the equations a=m·a·b/(mf·l) and b=m·a·b/(mr·l) are put into the righthand side of the equation (6), thus obtaining the following equation:

$$Iz \frac{d\gamma}{dt} = \frac{m \cdot a \cdot b}{l} \left( \frac{Cfo}{mf} - \frac{Cro}{mr} \cdot \frac{\partial \delta r}{\partial \delta f} \right) \cdot \Delta \delta f \quad (6')$$

Because the equation (6') is produced by modifying the equation (2) several times, it represents the yawing moment on the motor vehicle immediately after it is steered. Such yawing moment immediately after the motor vehicle is steered will hereinafter referred to as remaining yawing moment.

An increase $\Delta \gamma$ in the yaw rate $\gamma$ within a short period of time $\Delta t$ immediately after the motor vehicle is steered is given by:

$$\frac{d\gamma}{dt} \sim \frac{\Delta \gamma}{\Delta t} \quad (7)$$

By putting the equation (7) into the lefthand side of the equation (6'), $\Delta \gamma$ is defined as follows:

$$\Delta \gamma = \frac{m \cdot a \cdot b}{l \cdot Iz} \left( \frac{Cfo}{mf} - \frac{Cro}{mr} \cdot \frac{\partial \delta r}{\partial \delta f} \right) \cdot \Delta \delta f \cdot \Delta t \quad (8)$$

By dividing both sides of the equation (8) by $\Delta \delta f$, a transient yaw rate gain $\Delta \gamma / \Delta \delta f$ immediately after the motor vehicle is steered is given by:

$$\frac{\Delta \gamma}{\Delta \delta f} = \frac{m \cdot a \cdot b}{l \cdot Iz} \left( \frac{Cfo}{mf} - \frac{Cro}{mr} \cdot \frac{\partial \delta r}{\partial \delta f} \right) \cdot \Delta t \quad (9)$$

The remaining yawing moment expressed by the equation (6) is essentially the same as the transient yaw rate gain expressed by the equation (9). Accordingly, the yaw response to the steering action while the motor vehicle is cornering can be evaluated based on the values of these two equations (6), (9).

In actually establishing the yaw response characteristics of a motor vehicle, a yaw rate gain when the motor vehicle is running straight ahead can be established as desired by selecting a gear ratio n of the front wheel angle $\delta f$ to the steering wheel steer angle $\theta sw$. The yaw responsiveness of the motor vehicle while it is making a turn is controlled by the ratio of an increase in the yaw rate gain to an increase in the ateral acceleration $\ddot{y}$, rather than by the absolute value of the yaw rate gain. Thus, while the motor vehicle is making a turn, it is important to recognize at what ratio the yaw rate gain increases as the lateral acceleration $\ddot{y}o$ increases.

In view of the foregoing, the variable:

$$\frac{Cfo}{mf} - \frac{Cro}{mr} \cdot \frac{\partial \delta r}{\partial \delta f}$$

which is commonly found in the equations (6') and (9) is represented by $$J(\dot{y}o) = \frac{Cfo}{mf} - \frac{Cro}{mr} \cdot \frac{\partial \delta r}{\partial \delta f} \quad (10)$$

and how $J(\dot{y}o)$ varies as the lateral acceleration $\dot{y}o$ increases will be analyzed below. $J(\dot{y}o)$ will hereinafter be referred to as a yaw response term. The term "m·a·b/I" on the righthand side of the equation (6') and the term "m·a·b/(l·Iz)" on the righthand side of the equation (9) are constants.

Figure 3:
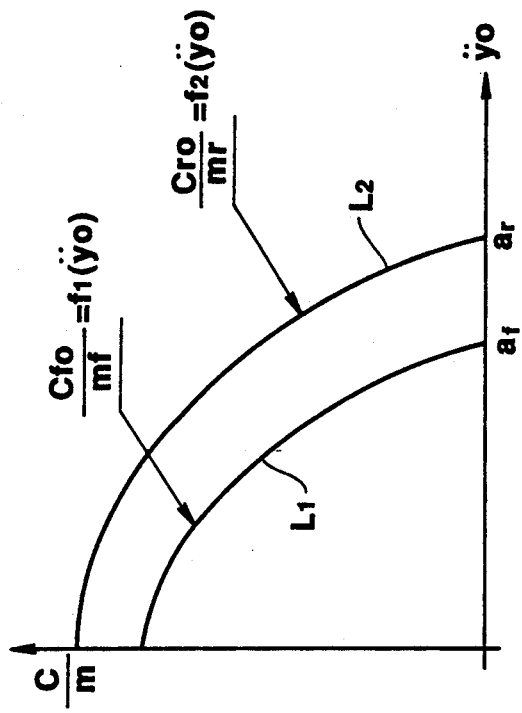
FIG. 3 is a diagram showing the manner in which cornering powers per unit weight of the front and rear road wheels vary while the motor vehicle shown in FIG. 1 is making a steady-state turn.

The terms "Cfo/mr", "Cro/mf" in the equation (10) are indicative of cornering coefficients which are produced by differentiating F1/mf, F2/mr on the vertical axis of FIG. 2 with the lateral slip angles $\alpha f$, or $\alpha f$ the front and rear tires. Since each of Cfo/mf, Cro/mr varies as the steady lateral acceleration $\dot{y}o$ varies as shown in FIG. 3, they can be represented as functions of the steady lateral acceleration $\dot{y}o$:

$$\frac{Cfo}{mf} = f1(\dot{y}o) \quad (11)$$

$$\frac{Cro}{mr} = f2(\dot{y}o) \quad (12)$$

as indicated by characteristic curves L1, L2 in FIG. 3. The functions $f1(\dot{y}o)$, $f2(\dot{y}o)$ become zero when the steady lateral acceleration $\dot{y}o$ exceeds given values $\alpha f$, $\alpha r$.

By putting the equations (11) and (12) into the equation (10), the yaw response term $J(yo)$ is expressed as follows:

$$J(\dot{y}o) = f1(\dot{y}o) - f2(\dot{y}o) \cdot \frac{\partial \delta r}{\partial \delta f} \quad (13)$$

Characteristics of the yaw response term $J(yo)$ in (i) a 2WS motor vehicle, (ii) a 4WS motor vehicle in which the steer angle ratio of the rear to front road wheels is $\partial \delta r/\partial \delta f = k =$ constant, and (iii) a 4WS motor vehicle to which the method of controlling the steer angle of rear road wheels according to the present invention is applied, will be described below.

(i) 2WS motor vehicle:

Since the rear wheel angle $\delta r$ of the 2WS motor vehicle is zero at all times, $$\partial \delta r/\partial \delta f = 0 \quad (4)$$

With the equation (14) put into the equation (13), we get $$J(\dot{y}o) = f1(\dot{y}o) = \frac{Cfo}{mf} \quad (15)$$

Inasmuch as the equivalent mass mf at the front axle is constant, the rate at which the yaw response term $J(\dot{y}o)$ varies is the same as the rate at which the cornering power Cfo of the front tire varies. Therefore, the yaw response term $J(\dot{y}o)$ in the 2WS motor vehicle varies as indicated by a characteristic curve L3 in FIG. 4, and the characteristic curve L3 is the same as the characteristic curve L1 in FIG. 3.

The characteristics with which the yaw response term in the 2WS motor vehicle varies are summarized as follows: The yaw response term $J(\dot{y}o)$ is mainly governed by the lateral force characteristics of the front tire. Since the steady lateral acceleration $\dot{y}o$ is zero when it exceeds the value $\alpha f$, the yawing motion of the motor vehicle cannot be controlled even if the driver operates the steering wheel.

(ii) 4WS motor vehicle in which the steer angle ratio of the rear to front road wheels is $\partial \delta r/\partial \delta f = k =$ constant:

It is known that when the rear road wheels are turned in the same direction as the front road wheels at a constant steer angle ratio k, the delay in the response of the lateral acceleration to the steering action is reduced, allowing the driver to steer the motor vehicle easily when the motor vehicle is running at medium and high speeds.

If the rear wheel steer angle is controlled in this manner, then we obtain:

$$\frac{\partial \delta r}{\partial \delta f} = k \; (k \text{ is constant}, 1 >> k > 0) \quad (16)$$

By putting the equation (16) into the equations (10) and (13) the following equation is obtained:

$$\begin{aligned} J(\dot{y}o) &= \frac{Cfo}{mf} - \frac{Cro}{mr} \cdot k \\ &= f1(\dot{y}o) - k \cdot f2(\dot{y}o) \end{aligned} \quad (17)$$

Figure 5:
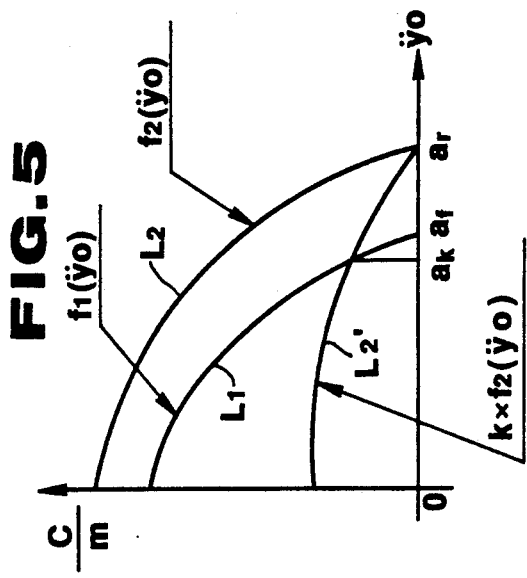
FIG. 5 is a diagram similar to FIG. 3, showing the manner in which cornering powers per unit weight of the front and rear road wheels of a 4WS motor vehicle having a constant steer angle ratio of the front to rear road wheels vary.

The term $k \cdot f2(\dot{y}o)$ in the equation (17) varies as indicated by a characteristic curve L2' in FIG. 5. The yaw response term varies as indicated by a characteristic curve L4 in FIG. 6 as it represents the difference between the characteristic curves L1, L2' in FIG. 5.

As can be understood from the curve L4, in the 4WS motor vehicle in which the steer angle ratio of the rear to front road wheels is $\partial \delta r/\partial \delta f = k =$ constant, when the steady lateral acceleration $\dot{y}o$ exceeds a certain value $\alpha k$, the yaw response term $J(\dot{y}o)$ becomes negative, and the direction of yaw response is reversed.

As described above in relation to Japanese Laid-Open Patent Publication No. 60-166561, if the rear road wheels are only controlled so that they are turned in the same direction as the front road wheels at the constant steer angle ratio k, then there is developed a zone in which the yaw response does not vary smoothly when the lateral acceleration $\dot{y}o$ is large.

(iii) 4WS motor vehicle to which the method of controlling the steer angle of rear road wheels according to the present invention is applied:

According to the rear wheel control method of the present invention, the ratio $\partial \delta r/\partial \delta f$ of the rear wheel steer angle $\delta r$ to the front wheel steer angle $\delta f$ is variably controlled depending on the magnitude of the lateral acceleration $\dot{y}o$. More specifically, it is assumed that $$\frac{\partial \delta r}{\partial \delta f} = g(\dot{y}o) \quad (18)$$

By putting the equation (18) into the equation (13), we obtain:

$$J(\dot{y}o) = f1(\dot{y}o) - g(\dot{y}o) \cdot f2(\dot{y}o) \quad (9)$$

Figure 7:
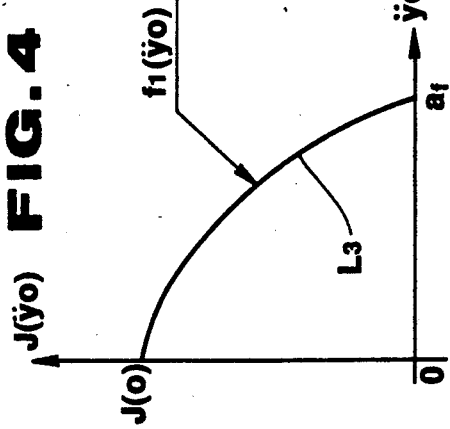
FIG. 7 is a diagram showing the manner in which a steer angle ratio varies with respect to a lateral acceleration in a method of controlling the steer angle of rear road wheels according to the present invention.

The steer angle ratio $g(\dot{y}o)$ is selected as indicated by a characteristic curve L5 in FIG. 7. Therefore, the term $g(\dot{y}o) \cdot f2(\dot{y}o)$ varies as indicated by a characteristic curve L5' in FIG. 8. As a result, as indicated by a characteristic curve L6 in FIG. 8, the yaw response term $J(\dot{y}o)$ smoothly varies such that it always has a positive value for a lateral acceleration yo over the entire range of zero to the prescribed value ar. According to the present invention, therefore, the steer angle ratio g(ẏo) is selected to meet the following:

$$J(\dot{y}o) = f1(\dot{y}o) - g(\dot{y}o) \cdot f2(\dot{y}o) \geq 0$$

From another standpoint, the rate at which the yaw response term J(ẏo) decreases as the lateral acceleration ẏo increases on the characteristic curve L6 is smaller than the rate for the 4WS motor vehicle (=characteristic curve L4) having a constant steer angle ratio k. Therefore, a yaw response in a desired direction can smoothly be achieved up to a high lateral acceleration.

Figure 8:
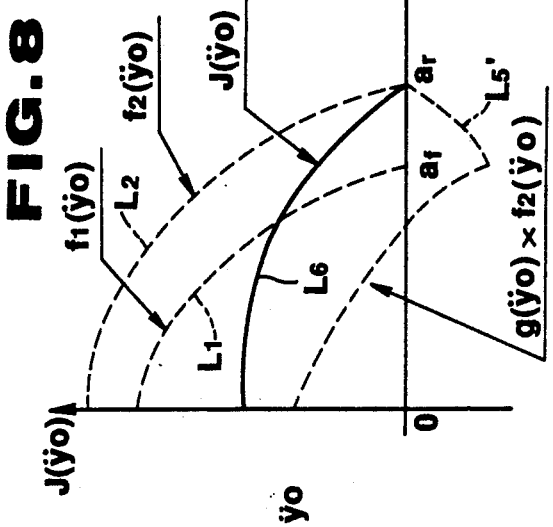
FIG. 8 is a diagram showing the manner in which a yaw response varies with respect to a lateral acceleration in a 4WS motor vehicle to which the control method of the present invention is applied.
Figure 9:
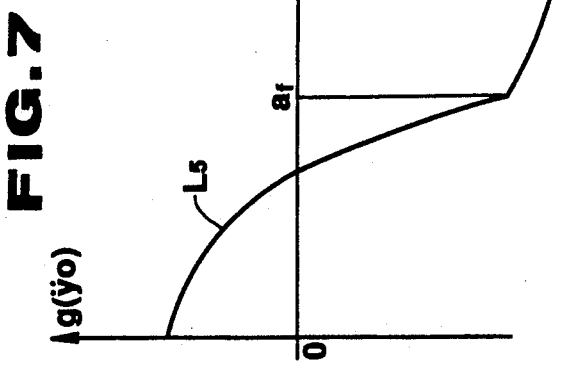
FIG. 9 is a graph showing a combination of the yaw response characteristic curves of FIGS. 4, 6, and 8.

In order to establish the steer angle ratio g(ẏo), i.e., the characteristic curve L5, the desired characteristic curve L6 shown in FIG. 8 is first established.

The equation (19) can also be defined as:

$$f1(\dot{y}o) - g(\dot{y}o) \cdot f2(\dot{y}o) = J(\dot{y}o) \quad (20)$$

Solving the equation (20) for g(ẏo), we get:

$$g(\dot{y}o) = f1(\dot{y}o) - J(\dot{y}o)/f2(\dot{y}o) \quad (21)$$

The steer angle ratio g(ẏo) can be determined according to the equation (21) since the terms f1(ẏo), J(ẏo), f2(ẏo) on the righthand side of the equation (21) are determined respectively by the characteristic curves L1, L6, L2 in FIG. 8.

The yaw response terms J(ẏo) represented respectively by the characteristic curves L3, L4, L6 are divided by J(0) when ẏo=0 in these curves, thus producing dimensionless functions J(ẏo)/J(0). These functions J(ẏo)/J(0) are represented respectively by characteristic curves L3', L4', L6' in FIG. 9.

In order to determine the steer angle ratio g(ẏo) based on the equation (21), it is necessary to know f1(ẏo) and f2(ẏo) accurately to a certain extent. Inasmuch as f1(ẏo) and f2(ẏo) are given as f1(ẏo)=Cfo/mf and f2(ẏo)=Cro/mr from the equations (11), (12), they are determined depending on the tire characteristics. However, when the motor vehicle is actually traveling, the cornering powers Cfo, Cro often differ from theoretical values of the tires themselves because of road conditions and suspensions of the motor vehicle.

In reducing the present invention to practice, the theoretical characteristic values of the tires themselves are first employed, and the steer angle ratio g(ẏo) is theoretically determined according to the equation (21). Then, using the theoretically determined steer angle ratio g(ẏo)th, the 4WS motor vehicle is run in an experiment while controlling the rear wheel steer angle. As a result of such an experiment, the actual yaw response J(ẏo) can be confirmed. The steer angle ratio g(ẏo) should preferably be finally be adjusted in view of the experimental result.

The control method according to the present invention offers more advantageous results if there is effected "model adaptive control" in which the yaw response to steering action is always measured to obtain an actual yaw response J(ẏo)m the motor vehicle is traveling and the steer angle ratio is adjusted from time to time depending on the error between the measured actual yaw response J(ẏo)m and a theoretical yaw response J(ẏo)th.

Actual meanings of the yaw responses J(ẏo) represented by the characteristic curves L3, L4, L6 will be described below with reference to FIGS. 10 through 13A and 13B. In each example, it is assumed that the motor vehicle makes a steady-state turn as shown in FIG. 10, and the steering wheel steer angle θswo is instantaneously increased by a small amount Δθsw. For the sake of brevity, the distance a from the center of gravity to the front axle and the distance b from the center of gravity to the rear axle are assumed to be equal to each other.

Figure 4:
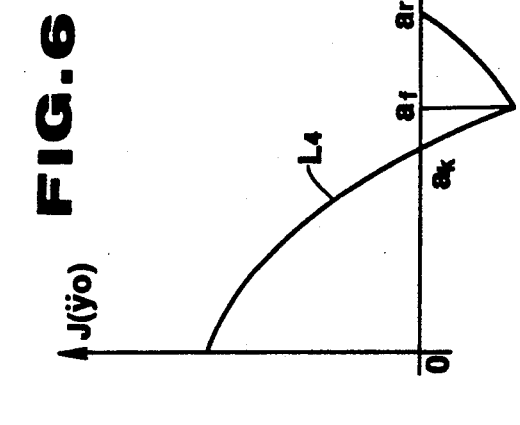
FIG. 4 is a diagram showing the manner in which a yaw response varies with respect to a lateral acceleration in a 2WS motor vehicle.

(A) 2WS motor vehicle:

The following motor vehicle behavior can also be understood from the equation (15) and the characteristic curve L3 shown in FIG. 4.

As shown in FIG. 11A, in a zone (ẏo=ai, ai<af) in which the steady-state lateral acceleration ẏo is smaller than the prescribed value af, an increase ΔF1 in the lateral force applied to the front road wheel is of a positive value, and an increase ΔF2 in the lateral force applied to the rear road wheel is always zero.

As shown in FIG. 11B, in zone (ẏo≧af) in which the steady-state lateral acceleration equal to or larger than the prescribed value af, an increase ΔF1 in the lateral force applied to the front road wheel is zero. Therefore, the yaw rate of the motor vehicle does not vary even if the driver makes steering action.

Figure 6:
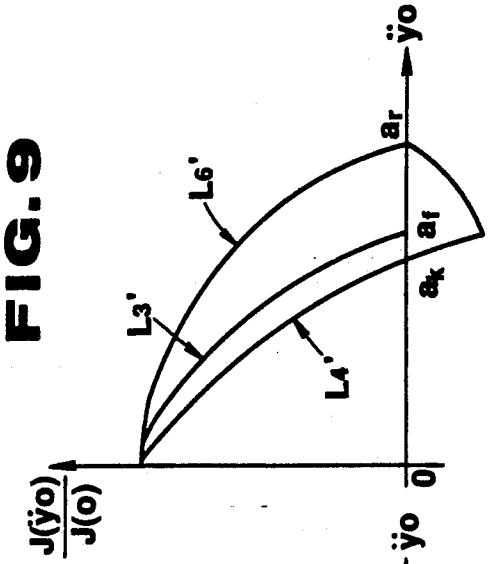
FIG. 6 is a diagram showing the manner in which a yaw response varies with respect to a lateral acceleration in the 4WS motor vehicle.

(B) 4WS motor vehicle with the steer angle ratio ∂δr/∂δr=k =constant:

The following motor vehicle behavior can also be understood from the equation (17) and the characteristic curve L4 shown in FIG. 6.

The front and rear road wheels are turned in the same direction.

As shown in FIG. 12A, in a zone (ẏo<ak) in which the steady-state lateral acceleration ẏo is smaller than the prescribed value ak, an increase ΔF1 in the lateral force applied to the front road wheel and an increase ΔF2 in the lateral force applied to the rear road wheel are of positive values and ΔF1>ΔF2).

In a zone (ẏo≧ak, ak<af<ar) in which the steady-state lateral acceleration ẏo exceeds the prescribed value ak, the yaw response J(ẏo) is zero or negative.

More specifically, as shown in FIG. 12B, if ẏo=ak, both an increase ΔF1 in the lateral force applied to the front road wheel and an increase ΔF2 in the lateral force applied to the rear road wheel are of positive values and equal to each other. Thus, ΔF1=ΔF2, and the yaw rate of the motor vehicle does not vary even if the driver takes steering action.

When the steady-state lateral acceleration yo is equalized to the prescribed value af, as shown in FIG. 12C, an increase ΔF1 in the lateral force applied to the front road wheel becomes zero, and an increase ΔF2 in the lateral force applied to the rear road wheel has a positive value. If the driver effects steering action at this time, the yaw rate varies in a direction opposite to the direction in which the motor vehicle is intended to turn.

If the steady-state lateral acceleration yo exceeds the prescribed value ar (ẏo≧ar), as shown in FIG. 12D, both an increase ΔF1 in the lateral force applied to the front road wheel and an increase ΔF2 in the lateral force applied to the rear road wheel become zero. Under this condition, the yaw rate of the motor vehicle does not vary even if the driver takes steering action.

Before and after the conditions shown in FIGS. 12B, 12C, and 12D, there are produced zones in which the yaw response J(ẏo) does not vary smoothly.

(C) 4WS motor vehicle to which the rear wheel steer control method of the present invention is applied:

As described above with respect to the characteristic curve L6 shown in FIG. 8, the relationship: $f1(\dot{y}o)-g(\dot{y}o)\cdot f2(\dot{y}o)\geq 0$ is effective in a range $\dot{y}o<ar$. Therefore, when the front and rear road wheels are turned in the same direction as shown in FIG. 13A, both an increase $\Delta F1$ in the lateral force applied to the front road wheel and an increase $\Delta F2$ in the lateral force applied to the rear road wheel are of positive values and $\Delta F1>\Delta F2$. Consequently, a desired yaw response is achieved up to a high lateral acceleration $\dot{y}o$.

As shown in FIG. 13B, in a zone ($\dot{y}o\geq ar$) in which the steady-state lateral acceleration $\dot{y}o$ equal to or larger than the prescribed value ar, both an increase $\Delta F1$ in the lateral force applied to the front road wheel and an increase $\Delta F2$ in the lateral force applied to the rear road wheel are zero, and hence $\Delta F1=0$, $\Delta F2=0$. The yaw rate of the motor vehicle does not vary even if the driver takes steering action.

According to the rear wheel steer angle control method of the present invention, as described above, it is to achieve a yaw response $J(\dot{y}o)$ in a desired direction smoothly up to a higher lateral acceleration ar than possible with the conventional 4WS motor vehicles. Since the steer angle ratio $g(\dot{y}o)$ is easily determined from the equation (21), the yaw response characteristics can be established with greater freedom.

A motor vehicle which is equipped with a 4WS system for carrying out the rear wheel steer angle control method of the present invention will now be described with reference to FIGS. 14 through 21.

Figure 14:
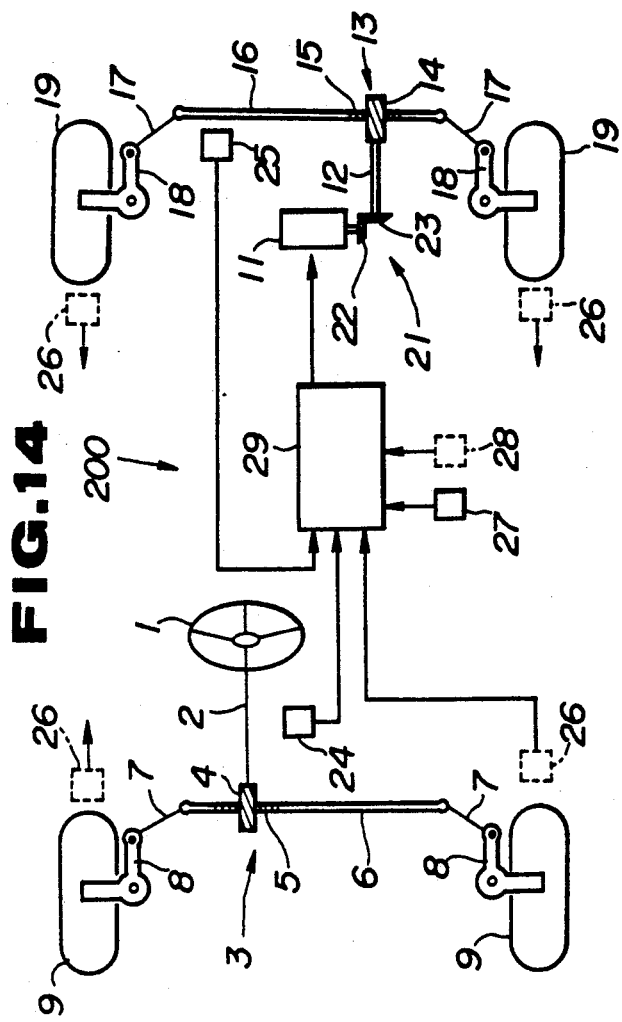
FIG. 14 is a schematic plan view of a 4WS motor vehicle having a steering system which is used to carry out the control method according to the present invention.

As shown in FIG. 14, a 4WS motor vehicle 200 has a steering wheel 1, a front steering gear mechanism 3, a pair of front road wheels 9, an electric motor 11 as an actuator, a rear steering gear mechanism 13, a pair of rear road wheels 19, various sensors 24, 25, 26, 27, 28, and a rear wheel steer angle controller 29. The front steering gear mechanism 3 comprises a pinion 4 mounted on a steering shaft 2, and a rack 5 on a front rack shaft 6. Front wheel knuckle arms 8 are coupled respectively to the opposite ends of the rack shaft 6 through respective tie rods 7. The rear steering gear mechanism 13 comprises a pinion 14 mounted on a pinion shaft 12 rotatable by the motor 11, and a rack 15 on a rear rack shaft 16. Rear wheel knuckle arms 18 are coupled respectively to the opposite ends of the rack shaft 16 through respective tie rods 17. A bevel gear mechanism 21 comprising a pair of bevel gears 22, 23 is connected between the motor 11 and the pinion shaft 12. The sensors include a front wheel steer angle sensor 24, a rear wheel steer angle sensor 25, vehicle speed sensors 26, a lateral acceleration sensor 27, and a yaw rate sensor 28 which may be selectively provided or dispensed with.

Detected signals from the sensors 24 through 28 are sent to the controller 29, which energizes the motor 11 to turn the rear road wheels 19 in response to the turning of the front road wheels 9.

Figure 15:
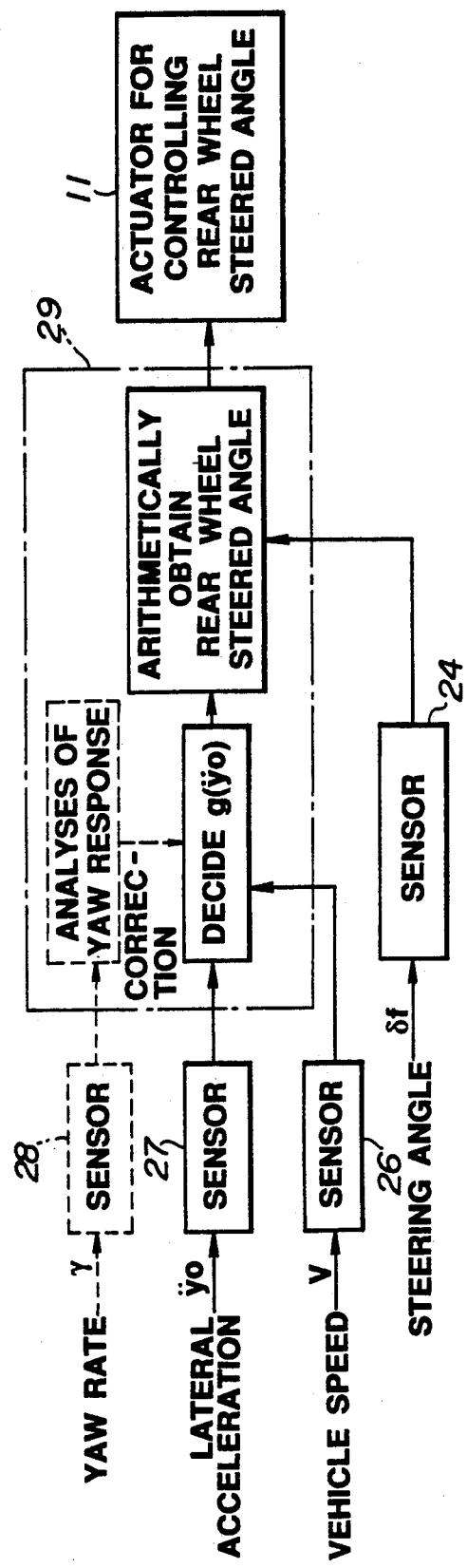
FIG. 15 is a block diagram of the steering system shown in FIG. 14.

FIG. 15 shows in block form the 4WS steering system shown in FIG. 14, and illustrates how signals are transmitted and processed for the control of the steer angle of the rear road wheels.

As described above, the yaw response expressed by the equation (19), i.e., $J(\dot{y}o)=f1(\dot{y}o)-g(\dot{y}o)\cdot f2(\dot{y}o)$, is controlled so that it has a positive value at all times insofar as the cornering power of the rear wheel tires has a finite value ($\dot{y}o<ar$). That is, the rear wheel steer angle is controlled so that $J(\dot{y}o)=f1(\dot{y}o)-g(\dot{y}o)\cdot f2(\dot{y}o)\geq 0$.

Such a control process is effected by the controller 29 as shown in FIGS. 16 through 19 or FIGS. 20 and 21.

FIGS. 16 through 19 show a control sequence for effecting a rear wheel steer angle control method according to a first embodiment of the present invention.

Figure 17:
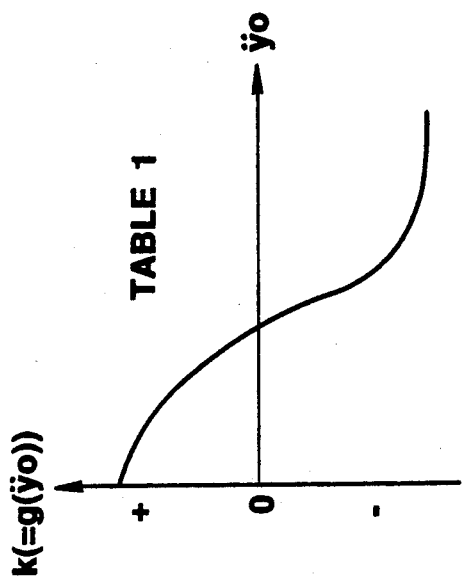
FIG. 17 is a data table used in a step in the control sequence shown in FIG. 16.
Figure 19:
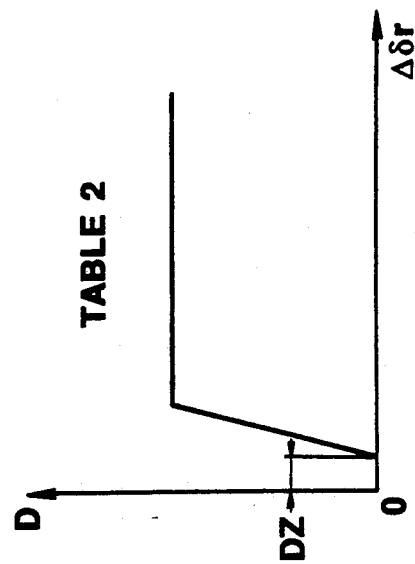
FIG. 19 is a data table used in a step in the control sequence shown in FIG. 18.

When an ignition switch is turned on, an initializing step is effected and a signal processing operation is started. In a step p1, the lateral acceleration $\dot{y}o$ and the front wheel angle $\delta f$ are read respectively from the sensors 27, 24. Actually, the steering wheel steer angle $\theta sw$ is read from the sensor 24, and the front wheel steer angle $\delta f$ is calculated based on the steering wheel steer angle $\theta sw$. In a next step P2, a steer angle ratio k ($=g(\dot{y}o)$) of the rear to front wheels is read from a data table 1 (FIG. 17), using the lateral acceleration $\dot{y}o$ as an address. The data of the data table 1 shown in FIG. 17 are essentially the same as the characteristic curve L5 of FIG. 7, but have actually been finely adjusted in view of the results of an actual experiment in which the motor vehicle was run. Then, the steer angle ratio k thus read and the front wheel steer angle $\delta f$ read in the step P1 are multiplied to determine a target rear wheel steer angle $\delta ro$ in a step P3.

The rear road wheels are actually turned in a step P4 which is a rear wheel turning routine. The rear wheel turning routine is shown in detail in FIG. 18.

Figure 18:
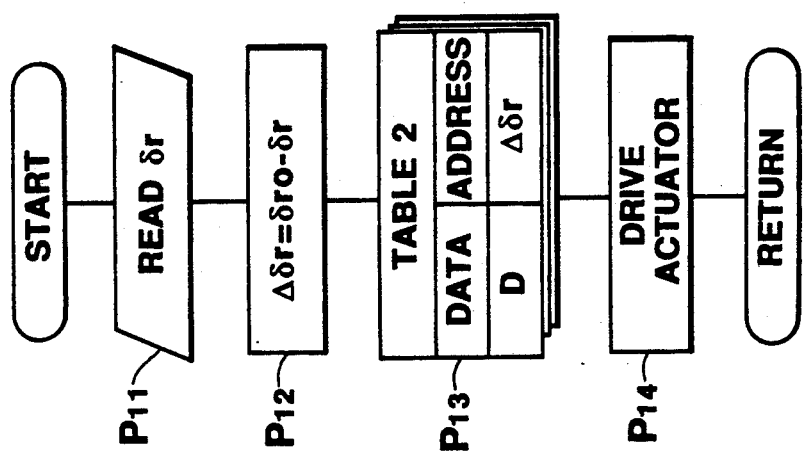
FIG. 18 is a detailed flowchart of a control process for steering rear road wheels in the control sequence shown in FIG. 16.
Figure 16:
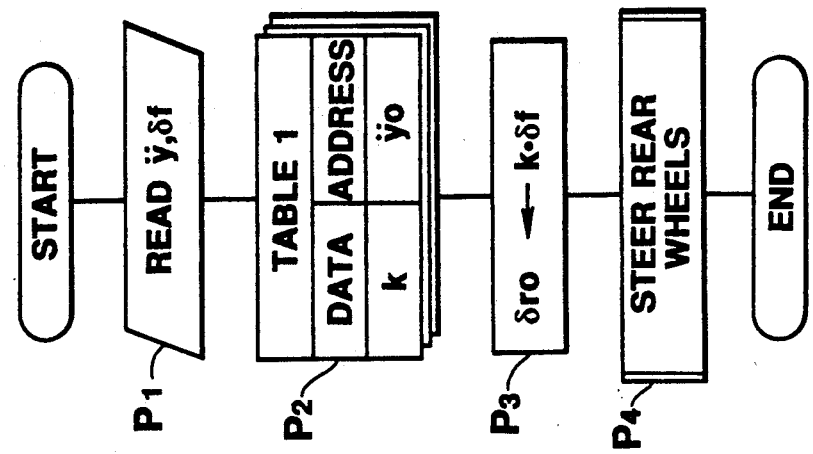
FIG. 16 is a flowchart of a control sequence to be executed by a controller of the steering system of FIG. 14 for carrying out a control method according to a first embodiment of the present invention.

As shown in FIG. 18, an actual rear wheel angle $\delta r$ is read from the sensor 25 in a step P11. In a step P12, the actual rear wheel steer angle $\delta r$ is subtracted from the target rear wheel steer angle $\delta ro$, thus producing a difference or error $\Delta \delta r$. Using the error $\Delta \delta r$ as an address, a duty cycle D is read from a data table 2 shown in FIG. 19 in a step P13. The data table 2 has a dead zone DZ for preventing the motor 11 from hunting. Then, the motor 11 is energized by a voltage which is proportional to the duty cycle D in a step P14 until the actual rear wheel steer angle $\delta r$ reaches the target rear wheel steer angle $\Delta ro$.

After the routine of FIG. 18, control returns to the step P1 again.

According to the rear wheel steer angle control method shown in FIGS. 14 through 19, as described above with reference to FIGS. 7 through 9 and 13A, 13B, it is possible to obtain a yaw response $J(\dot{y}o)$ in a desired direction smoothly up to a higher lateral acceleration ar than possible with the conventional 4WS motor vehicles.

Instead of directly determining the lateral acceleration $\dot{y}o$ with the lateral acceleration sensor 27 shown in FIG. 14, the lateral acceleration $\dot{y}o$ may be calculated from the vehicle speed and the front wheel steer angle.

Figure 20:
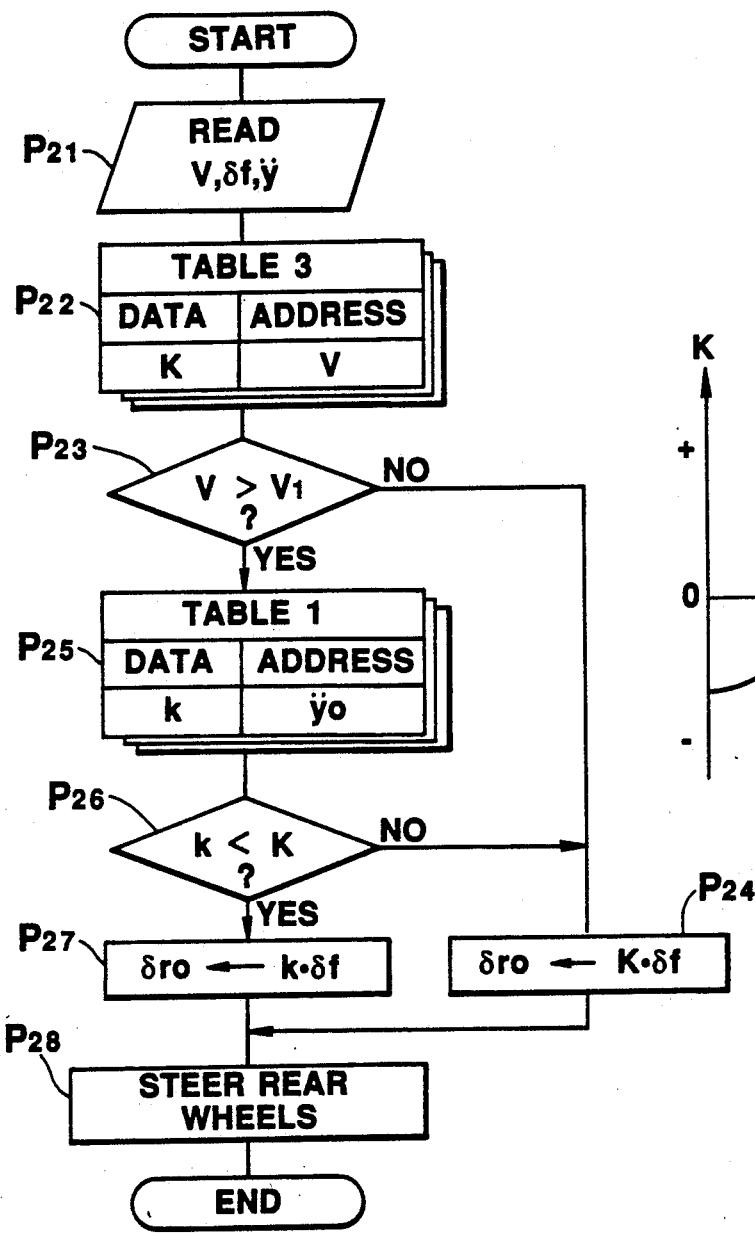
FIG. 20 is a flowchart of a control sequence to be executed by the controller of the steering system of FIG. 14 for carrying out a control method in accordance with a second embodiment of the present invention.
Figure 21:
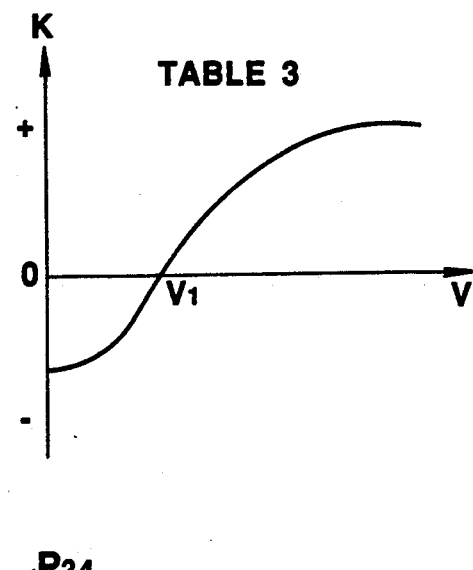
FIG. 21 a data table used in a step in the control sequence shown in FIG. 20.

FIGS. 20 and 21 show a control sequence for carrying out a rear wheel steer angle control method according to a second embodiment of the present invention. In the second embodiment, a steer angle ratio k is referred to as an "auxiliary steer angle ratio", whereas a steer angle ratio K is referred to as a "main steer angle ratio". According to this embodiment, the steer angle of the rear wheels is basically controlled based on the main steer angle ratio K as shown in FIG. 21, but when the vehicle speed V and the lateral acceleration $\dot{y}o$ is large, the steer angle of the rear road wheels is controlled in the same manner as described with reference to FIGS. 16 through 19. When the steer angle of the rear road wheels is controlled based on only the main steer angle ratio K shown in FIG. 21, the rear road wheels are turned in the opposite direction to the front road wheels as long as the vehicle speed V is lower than a predetermined boundary value V1, and the rear road wheels are turned in the same direction as the front road wheels as long as the vehicle speed V is higher than the boundary value V1.

In FIG. 20, after an initializing process has been carried out, a vehicle speed V, a front wheel steer angle δf, and a lateral acceleration ÿo are read respectively from the vehicle speed sensor 26, the front wheel steer angle sensor 24, and the lateral acceleration sensor 27 in a step P21. Then, in a step P22, a main steer angle ratio K is read from a data table 3 shown in FIG. 21 by addressing the data table 3 with the vehicle speed V read in the step P1.

A next step P23 determines whether the detected vehicle speed V is higher than a boundary value V1 or not.

If the vehicle speed V is higher than the boundary value V1, then control goes to a step P25 in which an auxiliary steer angle ratio k is read from the data table 1 shown in FIG. 17 in the same manner as the step P22. Then, a step P26 determines whether the main steer angle ratio K which has been read in the step P22 is larger than the auxiliary steer angle ratio k which has been read in the step 25. If the main steer angle ratio K is larger than the auxiliary steer angle ratio k, then the auxiliary steer angle ratio k and the front wheel steer angle δf are multiplied to produce a target rear wheel steer angle δro in a step P27, after which control goes to a step P28.

If the vehicle speed V is not higher than the boundary value V1 in the step P23, or if the main steer angle ratio K is not larger than the auxiliary steer angle ratio k in the step P26, then the main steer angle ratio K and the front wheel steer angle δf are multiplied to determine a target rear wheel steer angle δro in the step P24, which is followed by the step P28.

In the step P28, the rear road wheels are turned to the target rear wheel steer angle δro determined in the step P27 or P24 according to the rear wheel steering routine shown in FIG. 18. Thereafter, control goes back to the step P21 again.

According to the rear wheel steer angle control method shown in FIGS. 20 and 21, which also takes the vehicle speed V into account, the rear road wheels are turned essentially based on the main steer angle ratio K shown in FIG. 21. Consequently, the motor vehicle is allowed to make small turns when it is running at low speeds, can easily be maneuvered when it is running at high speeds, and also is given a good yaw response even if the lateral acceleration ÿo applied to the motor vehicle is large when it is traveling at high speeds.

While not described in the first embodiment shown in FIGS. 16 through 19 and the second embodiment shown in FIGS. 20 and 21, the yaw rate sensor 28 indicated by the broken lines in FIG. 15 may be connected to the controller 29, and the model adaptive control, referred to above, may be carried out.

The present invention has been described as being applied to the motor vehicle with the fully electronically controlled 4WS system. However, it is also possible to carry out the control method of the present invention in a motor vehicle which has a hybrid 4WS system comprising a mechanical device including a gear ratio varying mechanism and an electronic control device.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A method of controlling steering operations of rear road wheels of a four-wheel steering motor vehicle, comprising the steps of:
   detecting a steering angle of the vehicle's front road wheels;
   detecting a lateral acceleration of the vehicle;
   determining a steer angle ratio of a rear wheel steering angle to a front wheel steering angle dependent on the detected lateral acceleration;
   determining a rear wheel steering angle dependent on said detected front wheel steering angle and said determined steer angle ratio; and
   steering the vehicle's rear road wheels according to the determined rear wheel steering angle;
   said steer angle ratio being further determined so as to be in a range defined by:

$$f1(\ddot{y}o) - g(\ddot{y}o) \cdot f2(\ddot{y}o) \geq 0$$

where
$\ddot{y}o$ = vehicle lateral acceleration while the motor vehicle is making a steady-state turn;
   $g(\ddot{y}o)$ = steer angle ratio;
   $f1(\ddot{y}o) = Cfo/mf$;
   $f2(\ddot{y}o) = Cro/mr$;
   Cfo, Cro are equivalent cornering powers of the tires of the front and rear road wheels while the motor vehicle is making a steady-state turn; and
   mf, mr are equivalent masses at the front and rear axles of the motor vehicle.

2. A method of controlling a rear wheel steer angle of a four-wheel steering motor vehicle having front road wheels, rear road wheels, a steering wheel, a front wheel steering mechanism for turning the front road wheels in response to steering action of the steering wheel, and a rear wheel steering mechanism for turning the rear road wheels in response to the turning of the front road wheels, said method comprising the steps of:
   detecting a lateral acceleration and a front wheel steer angle;
   determining a final ratio of said rear wheel steer angle to said front wheel steer angle based on the detected lateral acceleration;
   determining a target rear wheel steer angle from said final ratio and said front wheel steer angle;
   turning said rear road wheels to said target rear wheel steer angle; and
   determining said final ratio such that a transient yaw rate gain represented by a ratio of an increase in a yaw rate to an increase in said front wheel steer angle immediately after the motor vehicle is steered is positive while the lateral acceleration is smaller than a predetermined value.

3. A method according to claim 2, wherein said transient yaw rate gain is defined by:

$$\frac{\Delta \gamma}{\Delta \delta f} = \frac{m \cdot a \cdot b}{l \cdot Iz} \left( \frac{Cfo}{mf} - \frac{Cro}{mr} \cdot \frac{\partial \delta r}{\partial \delta f} \right) \cdot \Delta t \qquad (9)$$

where m: vehicle mass;
a: distance from the center of gravity to the front axle;
b: distance from the center of gravity to the rear
l: wheelbase (=a+b);
mf: equivalent vehicle mass at the front axle;
mr: equivalent vehicle mass at the rear axle;
Cfo: equivalent cornering power of the front tires when the motor vehicle is making a steady-state turn;
Cro: equivalent cornering power of the rear tires when the motor vehicle is making a steady-state turn;
δf: front wheel steer angle;
δr: rear wheel steer angle; δIz: yawing moment of inertia of the motor vehicle;
t: time;
Y: yaw rate; and
ÿ: lateral acceleration,
and wherein said final ratio is determined so that $$\frac{m \cdot a \cdot b}{l \cdot Iz} \left( \frac{Cfo}{mf} - \frac{Cro}{mr} \cdot \frac{\partial \delta r}{\partial \delta f} \right) \cdot \Delta t \geq 0$$

4. A method according to claim 3, wherein said final ratio is determined such that the term:

$$\frac{Cfo}{mf} - \frac{Cro}{mr} \cdot \frac{\partial \delta r}{\partial \delta f}$$

which varies depending on the lateral acceleration is positive below said predetermined value.

5. A method according to claim 4, wherein said step of determining said final ratio based on said lateral acceleration comprises the steps of:

detecting a vehicle speed;

determining a main steer angle ratio as a function of the vehicle speed based on said detected vehicle speed such that the rear road wheels are turned in the opposite direction to the front road wheels when the vehicle speed is lower than a predetermined boundary value and the rear road wheels are turned in the same direction as the front road wheels when the vehicle speed is higher than said predetermined boundary value;

determining whether said detected vehicle speed is higher than said predetermined boundary value or not;

determining an auxiliary steer angle ratio such that when said detected vehicle speed is higher than said predetermined boundary value, said transient yaw rate gain is positive depending on said lateral acceleration while the lateral acceleration is smaller than said predetermined value;

determining whether said determined auxiliary steer angle ratio is smaller than said determined main steer angle ratio, and employing the determined auxiliary steer angle ratio as said final ratio if the auxiliary steer angle ratio is smaller than the main steer angle ratio; and employing said determined main steer angle ratio as said final ratio if said detected vehicle speed is not higher than said predetermined boundary value or said determined auxiliary steer angle ratio is not smaller than said determined main steer angle ratio.

6. A method according to claim 4, wherein said four-wheel steering motor vehicle has an understeer response.

* * * * *

UNITED STATES PATENT AND TRADEMARK OFFICE
CERTIFICATE OF CORRECTION

PATENT NO. : 5,019,982

DATED : May 28, 1991

INVENTOR(S) : Furukawa

It is certified that error appears in the above-identified patent and that said Letters Patent is hereby corrected as shown below:

on cover page, in ABSTRACT [57] lines 7,9,10 change "(yo)" to --(ÿo)--.

Column 1, line 31, change "cf" to --$\alpha f$--.
Column 2, line 39, change "f1(ÿo)-g(ÿo)·f2(ÿo)$\geq$0" to --f1(ÿo)-g(ÿo)·f2(ÿo)$\geq$0--.
Column 5, line 28, change ", or $\alpha f$" to --, $\alpha r$ of--.
Column 6, line 57, change "ateral" to --lateral--.
Column 7, line 9, change "m·a·b/(1·Iz) to --"m·a·b/(1·Iz)"--;
Column 7, line 11, change "Cfo/mr" to --"Cfo/mf"-- and change "Cro/mf" to --"Cro/mr"--;
" , line 14, change ", or $\alpha f$" to --, $\alpha r$ of--;
" , line 30, change "J(yo)" to --J(ÿo)--;
" , line 36, change "J(yo)" to --J(ÿo)--.
Column 8, line 29, delete "response term $\lambda$ varies as indicated" change to -- response term J(ÿo) varies as indicated --;
" , line 64, change "J(ÿo)=f1(ÿo)-g(ÿo)·fs(yo)  (9)" to --J(ÿo)=f1(ÿo)-g(ÿo)·f2(ÿo)  (19)--.
Column 9, line 1, change "yo" to --ÿo--;
" , line 21, change "g(ÿo)" to --g(ÿo)--
" , line 61, after "J(ÿo)r" insert --while--;
" , line 62, after "ratio" insert --g(ÿo)--.

UNITED STATES PATENT AND TRADEMARK OFFICE
CERTIFICATE OF CORRECTION

PATENT NO. : 5,019,982

DATED : May 28, 1991

INVENTOR(S) : Furukawa

It is certified that error appears in the above-identified patent and that said Letters Patent is hereby corrected as shown below:

Column 10, line 20, after "acceleration" insert —ÿo—;
" , line 15, change "AF1" to — ΔF1—;
" , line 57, change "yo" to —ÿo—.
Column 11, line 21 after "is" insert —possible—.
Column 12, line 14, Change "g(yo)" to —g(ÿo)—.
Column 15, line 4, after "rear" insert —axle—.

Signed and Sealed this

Thirteenth Day of October, 1992

Attest:

DOUGLAS B. COMER

*Attesting Officer*     *Acting Commissioner of Patents and Trademarks*